May 26, 1964

KENZO SATO 3,134,172

BEARING HOLDING MECHANISM OF MINIATURE AIR
TURBINE FOR DENTAL HAND PIECE
Filed Feb. 4, 1960

Inventor
K. Sato
Attys.

United States Patent Office 3,134,172
Patented May 26, 1964

3,134,172
BEARING HOLDING MECHANISM OF MINIATURE AIR TURBINE FOR DENTAL HAND PIECE
Kenzo Sato, Fushimi-ku, Kyoto-shi, Japan, assignor to Kabushiki Kaisha Morita Seisakusho (known as J. Morita Dental Mfg. Co., Ltd.), Kyoto-shi, Japan
Filed Feb. 4, 1960, Ser. No. 6,652
Claims priority, application Japan Feb. 20, 1959
1 Claim. (Cl. 32—27)

This invention relates to shaft bearings and related parts of small mechanisms, and more particularly it relates to a mechanism for supporting and holding the bearings of a miniature air turbine for dental hand pieces.

The rotational speeds of drills fitted to dental hand pieces have recently been stepped up at an ever increasing rate, but the operation of cutting at super-high speeds is accompanied by several kinds of difficulties. Hitherto, in the conventional mechanisms for this purpose, it has been the ordinary practice to install the bearings which support the shaft of the rotor by fixing said bearings to metallic parts within the case. However, it has been impossible to eliminate such disagreeable effects as the noise emitted by the bearings and vibrations caused by the tooth cutting operations, whereby the dental patients have been subjected to much discomfort and anguish. Said defects have been the greatest difficulty in super-high-speed dental cutting operation of this type.

It is an essential object of this invention to provide a mechanism wherein the above described disadvantages are eliminated, thereby completely removing the said discomfort to the dental patient.

It is another object of this invention to provide such a mechanism which is of simple, compact, yet strong, construction.

It is still another object of this invention to provide such a mechanism which has means for supplying a lubricant to the bearings and means for supplying cooling and flushing water to the cutting tool and tooth being cut.

Said objects and other objects, as will be apparent hereinafter, have been achieved by the mechanism of the present invention the details of which may be best understood by reference to the following detailed description of one representative embodiment of the invention when taken in connection with the accompanying drawing, in which:

FIG. 1 is a side elevational view, in section and to a greatly enlarged scale taken in a plane through the centerlines of the rotor piece, showing one embodiment of the mechanism of the invention;

FIG. 2 is an elevational front view of the mechanism of FIG. 1;

FIG. 3 is a plan view of the rotor of the embodiment of FIGS. 1 and 2.

Referring to the drawing, a case or housing 2 for the mechanism of this invention is fixed to the tube-shaped neck portion 1 of a dental hand piece (only partly shown). Within said case 2, a rotor 5, into which is inserted such part as an elastic chuck 4 for holding a tool 3, such as a diamond bar, is supported rotatably by miniature bearings 6 and 6'. One of the bearings, 6, is held elastically in the case 2 by an elastic collar 7 formed from hard rubber; and the other miniature bearing 6' is held by a similar collar 7' which is held fixedly in the case 2 by a cap screw 8.

The rotor 5 consists of a waisted, spool-shaped body and a plurality of blades 9, of semi-circular shape or shape similar thereto and smooth surfaces, imbedded at suitable angles in said body at its concaved portion, as will be clearly shown in FIG. 3. Compressed air is injected tangentially to rotor surface, through nozzles 10 and 10' provided in the case 2, at one side of the blades 9 and exhausted from the other side of said blades to cause the rotor 5 to rotate.

The miniature bearings 6 and 6' are lubricated by oil injected in spray form thereto from lubrication nozzles 11 and 11' by compressed air.

For cooling and flushing the cutting tool, as well as the teeth being operated upon during the dental cutting operation a cooling water pipe 12 is disposed within the neck portion 1 for ejecting cold water.

Since the mechanism of this invention has the construction described above, wherein the miniature bearings 6 and 6' supporting the shaft of the rotor 5 are, in turn, held to the case 2 elastically through the collars 7 and 7' formed from elastic, hard rubber, the metallic noise, which would otherwise be emitted from the miniature bearings 6 and 6' by the high-speed rotation of the rotor 5, is effectively prevented. Furthermore, vibrations occurring during tooth-cutting operation are absorbed. Accordingly, it is possible to eliminate the discomfort and anguish due to the vibrations and noise during the tooth-cutting operation to the dental patient, whereby it is possible to solve the most difficult problem of the super-high-speed dental cutting; and on this point, the invention has a high practical value.

While I have described one particular embodiment of my invention, it will, of course, be understood that I do not wish my invention to be limited thereto, since many modifications may be made and I, therefore, contemplate by the appended claim to cover all such modifications as fall within the true spirit and scope of my invention.

What I claim is:

An air turbine operated dental tool device comprising a casing, an air turbine rotor within said casing, said rotor having a hollow axial shaft portion, an elongated hollow elastic sleeve fitted within said hollow shaft for receivably mounting a dental tool therein, said housing having opposing end covers, bearing members at the forward and rearward ends of said rotor for supporting said rotor in said casing, at least two resilient rubber cylindrical collar members mounted in separate spaced relation to one another in said casing, each of said rubber collar members supporting one of said bearing members therein, said rubber collar members each having including lateral resilient side flange portions at their outer ends extending laterally toward the axis of said rotor and adapted to separate said bearing members from said opposing end covers of said casing, and the shaft of said rotor being mounted to said bearing members in a manner that the resilient rubber collar members may absorb the vibration produced by the rotation of the motor and shaft.

References Cited in the file of this patent

UNITED STATES PATENTS

| | | |
|---|---|---|
| 2,469,483 | Strong | May 10, 1949 |
| 2,689,769 | Ware | Sept. 21, 1954 |
| 2,698,131 | Cook | Dec. 28, 1954 |
| 2,897,596 | Maurer | Aug. 4, 1959 |
| 2,902,322 | Leister | Sept. 1, 1959 |
| 2,945,299 | Fritz | July 19, 1960 |
| 2,954,207 | Griffith | Sept. 27, 1960 |
| 2,983,519 | Staunt | May 9, 1961 |

FOREIGN PATENTS

| | | |
|---|---|---|
| 496,282 | Great Britain | Feb. 22, 1937 |